United States Patent
Hirata et al.

(10) Patent No.: US 8,051,643 B2
(45) Date of Patent: Nov. 8, 2011

(54) EXHAUST GAS PURIFICATION SYSTEM UTILIZING OZONE

(75) Inventors: Hirohito Hirata, Suntou-gun (JP); Masaru Kakinohaha, Susono (JP); Masaya Ibe, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 929 days.

(21) Appl. No.: 11/921,446

(22) PCT Filed: Jun. 12, 2006

(86) PCT No.: PCT/JP2006/312186
§ 371 (c)(1),
(2), (4) Date: Jan. 7, 2008

(87) PCT Pub. No.: WO2006/135073
PCT Pub. Date: Dec. 21, 2006

(65) Prior Publication Data
US 2009/0019844 A1    Jan. 22, 2009

(30) Foreign Application Priority Data
Jun. 17, 2005    (JP) .................... 2005-177995

(51) Int. Cl.
*F01N 3/00*    (2006.01)
(52) U.S. Cl. ........... 60/286; 60/275; 60/295; 60/297; 60/311; 96/108; 96/122; 96/130
(58) Field of Classification Search ............ 60/275, 60/286, 295, 297, 303, 311; 96/108, 111, 96/122, 130
See application file for complete search history.

(56) References Cited

U.S. PATENT DOCUMENTS

| | | | |
|---|---|---|---|
| 3,083,209 A * | 3/1963 | Habib et al. ................. 549/431 |
| 5,888,271 A * | 3/1999 | Tanimura et al. ................. 95/12 |
| 6,185,930 B1 | 2/2001 | Lepperhoff et al. |
| 6,212,883 B1 * | 4/2001 | Kang ................. 60/275 |
| 6,214,298 B1 * | 4/2001 | Tanimura et al. ........ 422/186.08 |
| 6,557,340 B1 * | 5/2003 | Twigg et al. ................. 60/275 |
| 6,716,398 B2 * | 4/2004 | Caren et al. ............. 422/186.04 |
| 2004/0060281 A1 | 4/2004 | Breuer et al. |
| 2004/0188238 A1 | 9/2004 | Hemingway et al. |
| 2005/0241295 A1 | 11/2005 | Breuer et al. |

FOREIGN PATENT DOCUMENTS

| | | |
|---|---|---|
| DE | 102 31 620 A1 | 1/2004 |
| EP | 0 602 963 A1 | 6/1994 |
| EP | 1 026 373 A2 | 8/2000 |
| JP | A 2000-282844 | 10/2000 |
| JP | B2 3311051 | 5/2002 |
| JP | A 2004-011592 | 1/2004 |
| JP | A 2005-502823 | 1/2005 |

* cited by examiner

*Primary Examiner* — Tu Nguyen
(74) *Attorney, Agent, or Firm* — Oliff & Berridge, PLC (57) ABSTRACT

An exhaust gas purification system provided with a trapping device (6) arranged on an engine exhaust passage and trapping particulate matter in the exhaust gas, an ozone generator (21) for generating ozone, and an ozone adsorbent (22) able to adsorb ozone, wherein at least part of the ozone generated by said ozone generator is adsorbed by said ozone adsorbent and, when particulate matter trapped on said trapping device should be removed, ozone adsorbed on the ozone adsorbent is desorbed from the ozone adsorbent and supplied to the trapping device. Due to this, it is possible to use an ozone generator with a relatively low ozone generating ability to burn off PM trapped on a filter etc. efficiently.

12 Claims, 5 Drawing Sheets

EXHAUST GAS PURIFICATION SYSTEM UTILIZING OZONE

TECHNICAL FIELD

The present invention relates to an exhaust gas purification system utilizing ozone.

BACKGROUND ART

In general, exhaust gas of a compression ignition type internal combustion engine (diesel type internal combustion engine) often contains so-called PM (particulate matter) formed mainly of carbon (C). This PM becomes a cause of deterioration of visibility and deposition of stain on buildings. For this reason, many internal combustion engines provide their exhaust passages with particulate filters (hereinafter referred to as "filters") etc. so as to trap the PM in the exhaust gas, and burn off the PM trapped on the filters by adding fuel to the exhaust gas, and burning the added fuel on the filters, or by using heaters to heat the filters, etc. to make the filters high in temperature.

However, if raising the temperature of a filter to burn off the PM in the exhaust gas in this way, the amount of fuel consumption increases with both the methods of adding fuel and heating by a heater and therefore deterioration of the fuel economy is invited. Therefore, in recent years, note has been taken of the point that ozone enables PM to be burned off even at a low temperature, and methods of using plasma to generate ozone and running the generated ozone into the filters etc. to remove the PM trapped on the filters etc. have been proposed.

Japanese National Patent Publication (A) No. 2005-502823 discloses an exhaust gas purification system providing a plasma generator at an upstream side of a filter in the exhaust, using this plasma generator to generate ozone or nitrogen dioxide, running the generated ozone or nitrogen dioxide into the filter, and burning the PM trapped on the filter. In this exhaust gas purification system, when the temperature of the exhaust gas is lower than a certain temperature threshold value (for example, 200° C.), the plasma generator mainly generates ozone, while when it is that temperature threshold value or more, the plasma generator mainly generates nitrogen dioxide. This is done because the power consumed when generating ozone is larger than the power consumed when generating nitrogen dioxide, so ozone is only generated in a temperature range where the ability of nitrogen dioxide to oxidize the PM is low, that is, a temperature range lower than the above temperature threshold value.

In this regard, the temperature of the exhaust gas in a compression ignition type internal combustion engine is a comparatively low. States of a temperature lower than the temperature threshold value continuing are not uncommon. For this reason, in the exhaust gas purification system, in many cases, the plasma generator generates ozone to burn off the PM trapped on the filter and therefore the power consumption becomes great.

Further, if trying burn off PM by ozone after a certain degree of PM has been trapped by the filter, a large amount of ozone would have to be generated in a relatively short time. If trying to generate a large amount of ozone in a short time, not only will the power consumption become large, but also the plasma generator will have to have a high ozone generating ability which will therefore end up inviting an increase in production costs.

DISCLOSURE OF THE INVENTION

Therefore, an object of the present invention is to provide an exhaust gas purification system able to burn off particulate matter trapped on a filter, etc. efficiently in spite of using an ozone generator with a relatively low ozone generating ability.

In an embodiment of the present invention, there is provided an exhaust gas purification system provided with a trapping device arranged on an engine exhaust passage and trapping particulate matter in the exhaust gas, an ozone generator for generating ozone, and an ozone adsorbent able to adsorb ozone, wherein at least part of the ozone generated by the ozone generator is adsorbed by the ozone adsorbent and, when particulate matter trapped on the trapping device should be removed, ozone adsorbed on the ozone adsorbent is desorbed from the ozone adsorbent and supplied to the trapping device.

According to the embodiment, when particulate matter trapped on the trapping device should be removed, the ozone adsorbed on the ozone adsorbent is supplied to the trapping device. For this reason, ozone greater than the ozone generating ability of the ozone generator can be supplied to the trapping device.

Note that "when particulate matter trapped on the trapping device should be removed" means, for example, when the trapping device has trapped particulate matter to an extent where if supplying both the ozone generated by the ozone generator and the ozone desorbed from the ozone adsorbent to the trapping device, almost all of the supplied ozone would react with the trapped particulate matter and almost no ozone would flow out from the trapping device, when the trapping device has trapped particulate matter and the resultant pressure loss due to the trapping device increases to over a predetermined value, etc.

In another embodiment of the present invention, the ozone adsorbent is formed by zeolite.

In another embodiment of the present invention, there are further provided a main passage leading from the ozone generator through the ozone adsorbent to the trapping device, a bypass passage branching off from the main passage and bypassing the ozone adsorbent, and an ozone flow rate adjustment valve provided at the part where the bypass passage branches off and adjusting the flow rate of the ozone generated by the ozone generator flowing into the bypass passage.

According to the embodiment, it is possible to select whether to have the ozone generated by the ozone generator be adsorbed by the ozone adsorbent or have it directly flow into the trapping device without being adsorbed by the ozone adsorbent. Note that the flow rate adjustment valve also includes a switch valve for switching between the main passage and bypass passage.

In another embodiment of the present invention, when the particulate matter trapped on the trapping device should be removed, the ozone flow rate adjustment valve is controlled so that the ozone generated by the ozone generator flows through the bypass passage.

According to the embodiment, when the particulate matter should be removed, ozone adsorbed on the ozone adsorbent may be supplied to the trapping device and also ozone generated by the ozone generator made to directly flow to the trapping device.

In another embodiment of the present invention, even when the particulate matter trapped on the trapping device should be removed, if the exhaust temperature is higher than a decomposition start temperature, the ozone flow rate adjusting valve is controlled so that the ozone generated by the ozone generator flows through the main passage.

According to the embodiment, even when particulate matter should be removed, if there is a possibility of the ozone ending up decomposing before reaching the trapping device, the ozone generated by the ozone generator may be prevented from being supplied to the trapping device and the generated ozone may be efficiently utilized for removal of the particulate matter.

In another embodiment of the present invention, there are further provided a branch passage branching from the engine exhaust passage and connected to the ozone adsorbent and an exhaust flow rate adjusting valve for adjusting the flow rate of exhaust gas flowing into the branch passage, wherein, when desorbing ozone from the ozone adsorbent, the exhaust flow rate adjusting valve is controlled so that at least part of the exhaust gas discharged from the internal combustion engine flows through the branch passage to the ozone adsorbent.

According to the embodiment, to desorb the ozone from the ozone adsorbent, the exhaust gas is used to raise the ozone adsorbent in temperature. Due to this, there is no longer a need to provide a heater for raising the temperature of the ozone adsorbent and the production costs can be reduced.

According to the present invention, it is possible to use an ozone generator with a relatively low ozone generating ability to efficiently burn off particulate matter trapped on a filter etc.

BRIEF DESCRIPTION OF THE DRAWINGS

The present invention may be more fully understood from the description of the preferred embodiments of the invention set forth below together with the accompanying drawings, in which.

BEST MODE FOR CARRYING OUT THE INVENTION

Figure 1:
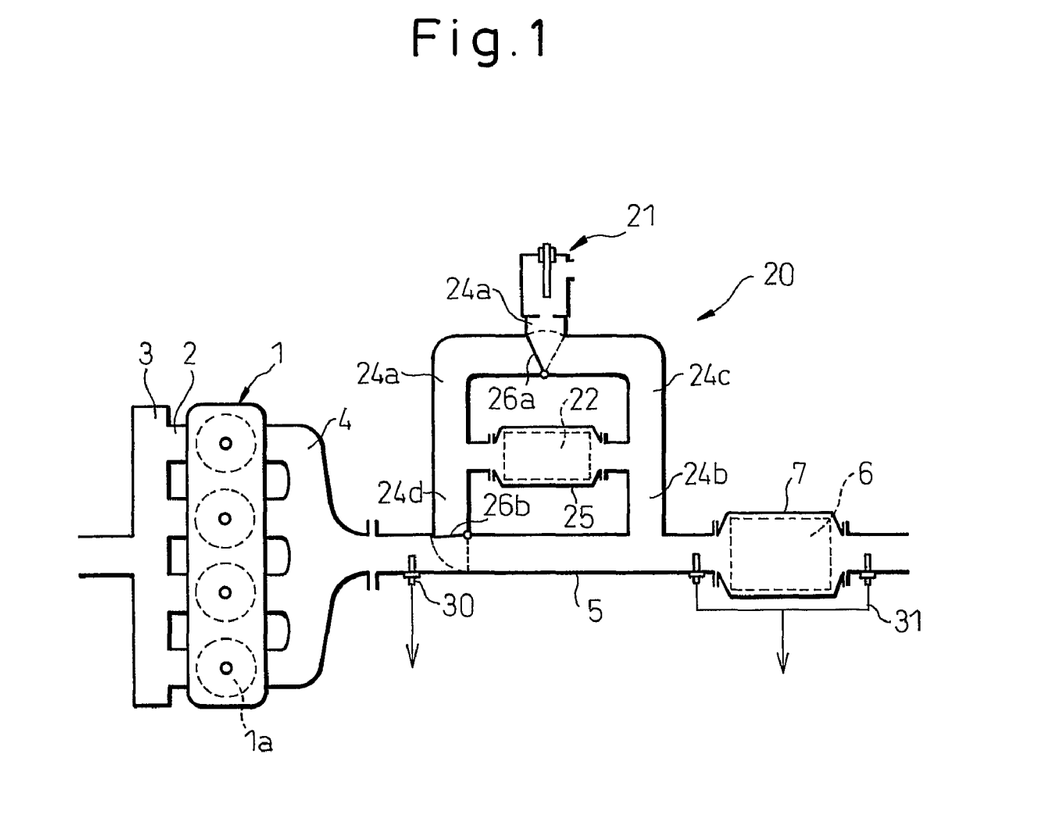
FIG. 1 is a view of an exhaust system of an internal combustion engine mounting an exhaust gas purification system of the present invention.

Below, an exhaust gas purification system of the present invention will be explained with reference to the drawings. FIG. 1 is a view showing a compression ignition type internal combustion engine in which the exhaust gas purification system of the present invention is utilized.

Referring to FIG. 1, an engine body 1 is provided with a plurality of cylinders 1a. Each cylinder 1a is connected through a corresponding intake tube 2 to a surge tank 3 and is connected through an exhaust manifold 4 and exhaust pipe 5 to a particulate filter (hereinafter referred to as a "filter") 6 housed in a filter casing 7. Note that in this description, the passage defined by the exhaust port (not shown), exhaust manifold 4, and exhaust pipe 5 is referred to as the "exhaust passage".

Figure 2A:
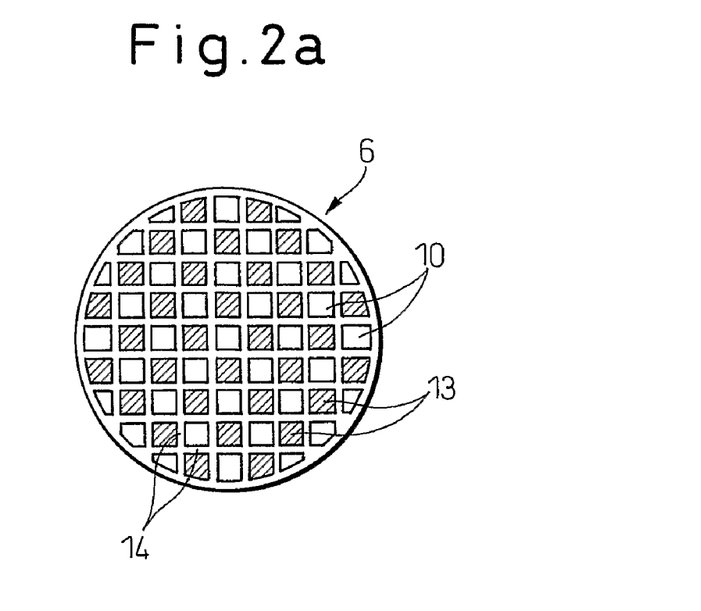
FIG. 2a is a schematic front view of a particulate filter.
Figure 2B:
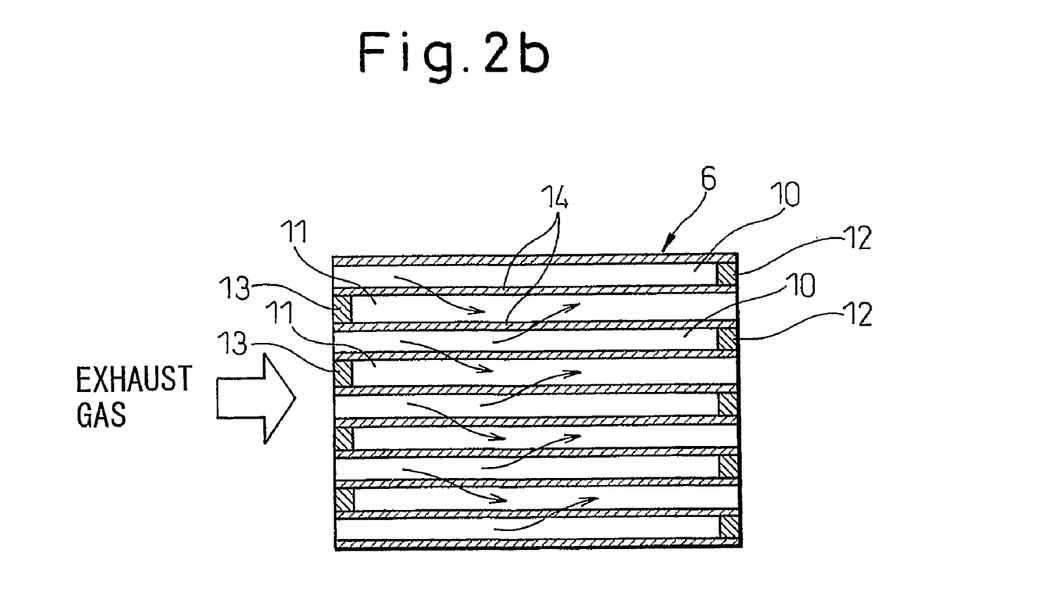
FIG. 2b is a sectional side view of a particulate filter.

FIG. 2a and FIG. 2b show the structure of the filter 6. Note that FIG. 2a is a front view of the filter 6, while FIG. 2b is a sectional side view of the filter 6. As shown in FIG. 2a and FIG. 2b, the filter 6 has a honeycomb structure provided with a plurality of exhaust passages 10 and 11 extending in parallel. These exhaust passages are comprised of exhaust inflow passages 10 with downstream ends closed by plugs 12 and exhaust outflow passages 11 with upstream ends closed by plugs 13. Note that the hatched parts in FIG. 2a show the plugs 13. Therefore, the exhaust inflow passages 10 and exhaust outflow passages 11 are alternately arranged via thin partitions 14.

The filter 6 is formed from a porous material such as cordierite. Therefore, the exhaust gas flowing into the exhaust inflow passage 10, as shown by the arrows in FIG. 2b, passes through the surrounding partitions 14 and flows out into the adjoining exhaust outflow passages 11.

Here, in a compression ignition type internal combustion engine, particulate matter mainly comprised of carbon (C) (hereinafter referred to as "PM") is produced in the combustion chambers. Therefore, the exhaust gas includes PM. The PM in the exhaust gas deposits on the circumferential wall surfaces of the exhaust inflow passages 10 and exhaust outflow passages 11 and on the inside wall surfaces of the pores in the partitions 14 to be thereby trapped when the exhaust gas flows through the filter 6 as shown in FIG. 2b.

The PM trapped on the circumferential wall surfaces of the filter 6 etc. in this way (hereinafter simply referred to as "on the filter") gradually builds up on the filter 6 resulting in the pores of the filter 6 becoming clogged. If the pores of the filter 6 become clogged in this way, the pressure loss of the exhaust gas due to the filter 6 becomes high and the operation of the internal combustion engine is detrimentally affected.

For this reason, various methods have been proposed for removing the PM deposited on the filter 6. One such method is to run ozone or another ingredient with an extremely high oxidation ability to the filter 6 to react with the PM built up on the filter 6 and thereby burn off the PM. By running ozone etc. to the filter 6 to burn off the PM in this way, the PM can be burned off at a comparatively low temperature. For this reason, for example, compared with the case of raising the filter in temperature to the general combustion temperature of PM (about 600° C.) to burn off the PM or running nitrogen dioxide ($NO_2$) as an oxidizing agent through the filter to burn off the PM, the oxidation temperature of the PM is low and therefore there is almost no need to raise the temperature of the filter when burning off the PM, so the fuel economy can be improved.

Therefore, in the present embodiment, there is provided an ozone supply system 20 able to supply ozone to the filter 6. As shown in FIG. 1, the ozone supply system 20 is provided with an ozone supply device 21 and an ozone adsorbent 22 able to adsorb ozone.

Figure 3:
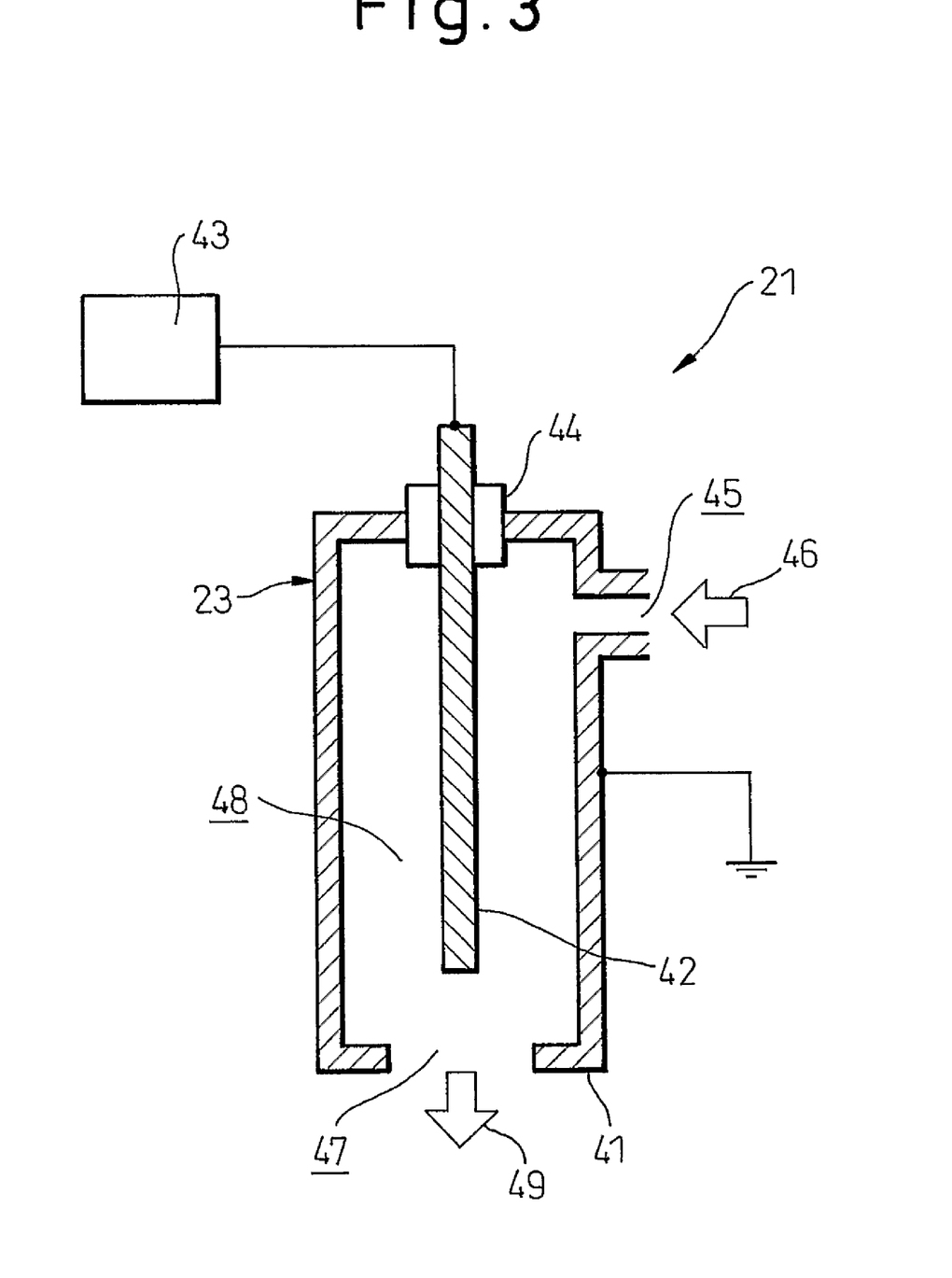
FIG. 3 is a schematic sectional view of an ozone supply device.

The ozone supply device 21 has an ozone generator 23 such as shown in FIG. 3 and an outside air pump (not shown) for introducing outside air into this ozone generator 23. The ozone generator 23 can generate ozone on the spot by treating the outside air introduced into the ozone generator 23 by plasma. This plasma may be any plasma so long as it can produce ozone from oxygen. For example, it may be discharge plasma, microwave plasma, or inductively coupled plasma.

The illustrated ozone generator 23 is a system for generating ozone by discharge plasma and has a tubular outer electrode 41 and a center electrode 42 arranged on the center axis of this outer electrode 41. The outer electrode 41 is grounded, while the center electrode 42 is connected to a power supply 43. The two electrodes 41 and 42 are insulated from each other by an insulator 44. Further, an outside air supply line 45 connected to an outside air pump is provided at part of the outer electrode 41. This outside air supply line 45 is used to supply outside air 46 to be treated by the discharge plasma to the ozone generator 23. At one end of the outer electrode 41, an ozone discharge outlet 47 is provided for discharging ozone obtained by treatment by the discharge plasma. In the thus configured ozone generator 23, outside air including oxygen is supplied through the outside air supply line 45 to between the two electrodes 41 and 42, voltage is applied by the power supply 43 to between the two electrodes 41 and 42, and discharge is caused between the electrodes 41 and 42 so as to generate plasma. Due to this, ozone is generated in the space 48 between the two electrodes 41 and 42. The gas 49 including the generated ozone is discharged from the ozone discharge outlet 47.

When using electro-discharge to generate plasma as explained above, the electrode used is made of a conductive material or semiconductive material. In particular a metal material, for example copper, tungsten, stainless steel, iron, aluminum, etc. may be preferably used. Note that with arc discharge, the electrodes become high in temperature, so the electrodes are preferably made using tungsten or another such high melting point material. Further, in the case of barrier discharge, an insulating material may be provided on the conductive material or semiconductive material. Due to this, in barrier discharge, the stability of the plasma, the durability of the electrodes, etc. can be improved.

Note that the ozone supply device 21 introduces outside air by the outside air pump, but it is also possible to introduce exhaust gas from the engine exhaust passage at the upstream side of the position where the ozone supply system 20 is provided. In this case, the pump for introducing the exhaust gas is not necessary.

The ozone adsorbent 22 basically tends to adsorb ozone when its temperature is a low temperature of the critical adsorption temperature (for example 200° C.) or less and tends to allow the adsorbed ozone to be desorbed when a higher temperature. In particular, when the temperature of the ozone adsorbent 22 is a high temperature and the flow rate of the fluid flowing through the ozone adsorbent 22 is high, a large amount of the adsorbed ozone can be desorbed.

In this embodiment, the ozone adsorbent 22 is comprised of zeolite. The silica-alumina ratio, that is, the pore size of the silica-alumina, determines whether ozone can be adsorbed (trapped) and the adsorption temperature. That is, it is believed that the ozone is physically adsorbed (trapped) by the ozone adsorbent 22 and that in the adsorption, basically no chemical change occurs.

Note that as the ozone adsorbent 22, any material which can physically adsorb ozone can be used. As this material, in addition to the above zeolite, activated charcoal etc. may be mentioned. However, if trying to use activated charcoal for physical adsorption of ozone, the activated charcoal itself reacts with the ozone to gradually burn. Therefore, use as an ozone adsorbent 22 is not preferred.

Further, the ozone supply system 20 has a plurality of flow tubes 24. In this embodiment, it has a first flow tube 24a to a fourth flow tube 24d, that is, four flow tubes. The first flow tube 24a is connected to the ozone supply device 21 and an adsorbent casing 25 housing the ozone adsorbent 22, while the second flow tube 24b is connected to the adsorbent casing 25 and exhaust pipe 5. In particular, the second flow tube 24b is preferably connected to the exhaust pipe 5 at a position immediately upstream of the filter 6. Note that the second flow tube 24b may also be connected to the filter casing 7 at the upstream side of the filter 6 instead of being connected to the exhaust pipe 5. By making the connection position of the second flow tube 24b immediately upstream of the filter 6 in this way, the ozone discharged from the second flow tube 24b is kept from being contained in the exhaust gas flowing through the exhaust pipe 5 for a long period of time. Due to this, the ozone reacts with the hydrocarbons (HC) etc. in the exhaust gas and is kept from being reduced to oxygen.

Further, the third flow tube 24c branches off from the first flow tube 24a and merges with the second flow tube 24b. That is, the third flow tube 24c is connected to the first flow tube 24a and the second flow tube 24b. The fourth flow tube 24d branches off from the exhaust pipe 5 and merges with the first flow tube 24a. That is, the fourth flow tube 24d is connected to the exhaust pipe 5 and the first flow tube 24a.

At the branch part where the third flow tube 24c branches off from the first flow tube 24a, a first switch valve 26a is provided. The first switch valve 26a is switched between an adsorbent inflow position where ozone supplied from the ozone supply device 21 flows in through the first flow tube 24a to the ozone adsorbent 22 (position shown by broken line in FIG. 1) and a bypass position where the ozone flows through the third flow tube 24c and bypasses the ozone adsorbent 22 (position shown by solid line in FIG. 1). Further, at the part where the fourth flow tube 24d branches off from the exhaust pipe 5, a second switch valve 26b is provided. The second switch valve 26b is switched between an exhaust pipe flow position where all of the exhaust gas discharged from the engine body 1 flows through the exhaust pipe 5 without flowing into the fourth flow tube 24d (position shown by solid line in FIG. 1) and a flow tube inflow position where all or part of the exhaust gas flows into the fourth flow tube 24d (position shown by broken line in FIG. 1).

Therefore, when the switch position of the first switch valve 26a is the adsorbent inflow position, the ozone supplied from the ozone supply device 21 flows into the ozone adsorbent 22. When the temperature of the ozone adsorbent 22 is the critical adsorption temperature or less, the inflowing ozone is adsorbed by the ozone adsorbent 22. On the other hand, when the switch position of the first switch valve 26a is the bypass position, the ozone supplied from the ozone supply device 21 flows through the third flow tube 24c and second flow tube 24b into the exhaust gas flowing through the exhaust pipe 5 and is supplied to the filter 6.

When the switch position of the second switch valve 26b is the flow tube inflow position, all or part of the exhaust gas discharged from the engine body 1 flows through the fourth flow tube 24d and part of first flow tube 24a to the ozone adsorbent 22. Due to this, the ozone adsorbent 22 is raised in temperature by the inflowing exhaust gas and becomes higher than the critical adsorption temperature, so the ozone which had been adsorbed by the ozone adsorbent 22 is desorbed. The desorbed ozone is made to flow out from the ozone adsorbent 22 together with the exhaust gas flowing into the ozone adsorbent 22 and is supplied through the second flow tube 24b to the exhaust gas flowing in the exhaust pipe 5 and to the filter 6.

Next, the operation of the thus configured ozone supply system 20 will be explained. When the temperature of the exhaust gas discharged from the engine body 1, in particular the temperature of the exhaust gas flowing through the exhaust pipe 5 immediately before the position where the ozone supply system 20 is provided (hereinafter referred to as "the immediately preceding exhaust temperature"), is lower than the decomposition start temperature, the switch position of the first switch valve 26a is made the bypass position. Due to this, the ozone supplied from the ozone supply device 21 flows through the third passage 24c and second passage 24b into the exhaust gas flowing through the exhaust pipe 5 and is supplied to the filter 6. Here, the "decomposition start temperature" means the temperature at which heat causes the ozone to start to decompose and is for example 300° C.

Due to this, when the immediately preceding exhaust temperature is lower than the decomposition start temperature, the ozone supplied from the ozone supply device 21 is supplied to the filter 6, and the PM deposited on the filter 6 and the PM in the exhaust gas are effectively burned off by the ozone. That is, if the temperature of the exhaust gas for which the ozone is supplied is lower than the decomposition start temperature, the ozone will almost never end up being decomposed by the heat in the interval from being supplied from the ozone supply system 20 to the exhaust gas to reaching the filter 6, so the supplied ozone can be effectively used for burning off the PM.

On the other hand, when the immediately preceding exhaust temperature is the decomposition start temperature or higher, the ozone will end up being decomposed in the interval from being supplied from the ozone supply system 20 to the exhaust gas to reaching the filter 6. For this reason, in the present embodiment, when the immediately preceding exhaust temperature is the decomposition start temperature or more, the switch position of the first switch valve 26a is set to the adsorbent inflow position. Due to this, the ozone supplied from the ozone supply device 21 is made to flow through the first passage 24a to the ozone adsorbent 22. Usually, the temperature of the ozone adsorbent 22 is below the critical adsorption temperature, so the ozone flowing to the ozone adsorbent 22 is adsorbed by the ozone adsorbent 22. Due to this, when the immediately preceding exhaust temperature is the decomposition start temperature or more, the ozone is kept from being decomposed without contributing to the burnoff on the filter 6.

In this way, by switching the first switch valve 26a in accordance with the immediately preceding exhaust temperature, it becomes possible to effectively burn off the PM deposited on the filter 6. However, when the amount of discharge of PM from the engine body 1 is large or when the state continues of the immediately preceding exhaust temperature being the decomposition start temperature or more, the ability of the ozone to burn off the PM is insufficient with just the supply of ozone from the ozone supply system 20 as explained above, PM deposits on the filter 6, and the pressure loss of the exhaust gas due to the filter 6 ends up becoming large.

Therefore, in the present embodiment, when the PM of the critical amount of deposition affecting the pressure loss deposits on the filter 6, not only is ozone supplied from the ozone supply device 21 to the filter 6, but also ozone adsorbed on the ozone adsorbent 22 is supplied to the filter 6. Specifically, the switch position of the first switch valve 26a is made the bypass position and the switch position of the second switch valve 26b is made the flow tube inflow position. Due to this, the ozone supplied from the ozone supply device 21 is supplied through the third passage 24c and second passage 24b to the filter 6.

Further, the exhaust gas discharged from the engine body 1 flows into the ozone adsorbent 22. The temperature of the exhaust gas is often higher than the critical adsorption temperature. Therefore, the ozone adsorbent 22 is also raised in temperature to a temperature higher than the critical adsorption temperature. Due to this, ozone is desorbed from the ozone adsorbent 22. Since a relatively large amount of exhaust gas flows through the ozone adsorbent 22, desorption is promoted. Further, the ozone desorbed from the ozone adsorbent 22 is supplied to the filter 6. That is, according to the present embodiment, when a large amount of PM deposits on the filter 6, a large amount of ozone is made to flow to the filter 6 to burn off the PM.

That is, in this embodiment, the supply of ozone by the ozone supply device 21 is held substantially constant regardless of the engine operating state. In an engine operating state where PM can be efficiently burned off by the supply of ozone, ozone is supplied to the filter 6, while in an engine operating state where PM cannot be efficiently burned off, ozone is made to be adsorbed by the ozone adsorbent 22. When a large amount of ozone should be run into the filter 6, the ozone is desorbed from the ozone adsorbent 22 and run into the filter 6. In this way, by utilizing the ozone adsorbent 22, even when a large amount of ozone should be run into the filter 6, it is not necessary to supply ozone only from the ozone supply device 21, so there is no longer a need for the ozone generating ability of the ozone generator 23 of the ozone supply device 21 to be made that high and consequently the production costs can be lowered and the ozone supply device 21 can be made compact.

Note that in the above explanation, the valves 26a and 26b are made switch valves able to switch between two positions, but these valves may also be flow rate adjusting valves able to continuously adjust the flow rates between these two positions. In this case, for example, instead of the first switch valve 26a, a flow rate adjusting valve (ozone flow rate adjusting valve) able to adjust the flow rate of ozone through the first passage 24a and the flow rate of ozone into the third passage 24c may be used. Further, instead of the second switch valve 26b, a flow rate adjusting valve (exhaust flow rate adjusting valve) able to adjust the flow rate of the exhaust gas flowing into the fourth passage 24d and the flow rate of exhaust gas flowing through the exhaust pipe 5 may be used.

Further, a heater may be attached around the ozone adsorbent 22. Due to this, even when for example the exhaust gas is low in temperature and the flow of the exhaust gas alone is not enough for raising the temperature of the ozone adsorbent 22 higher than the critical adsorption temperature, the temperature of the ozone adsorbent 22 can be raised higher than the critical adsorption temperature.

Figure 4:
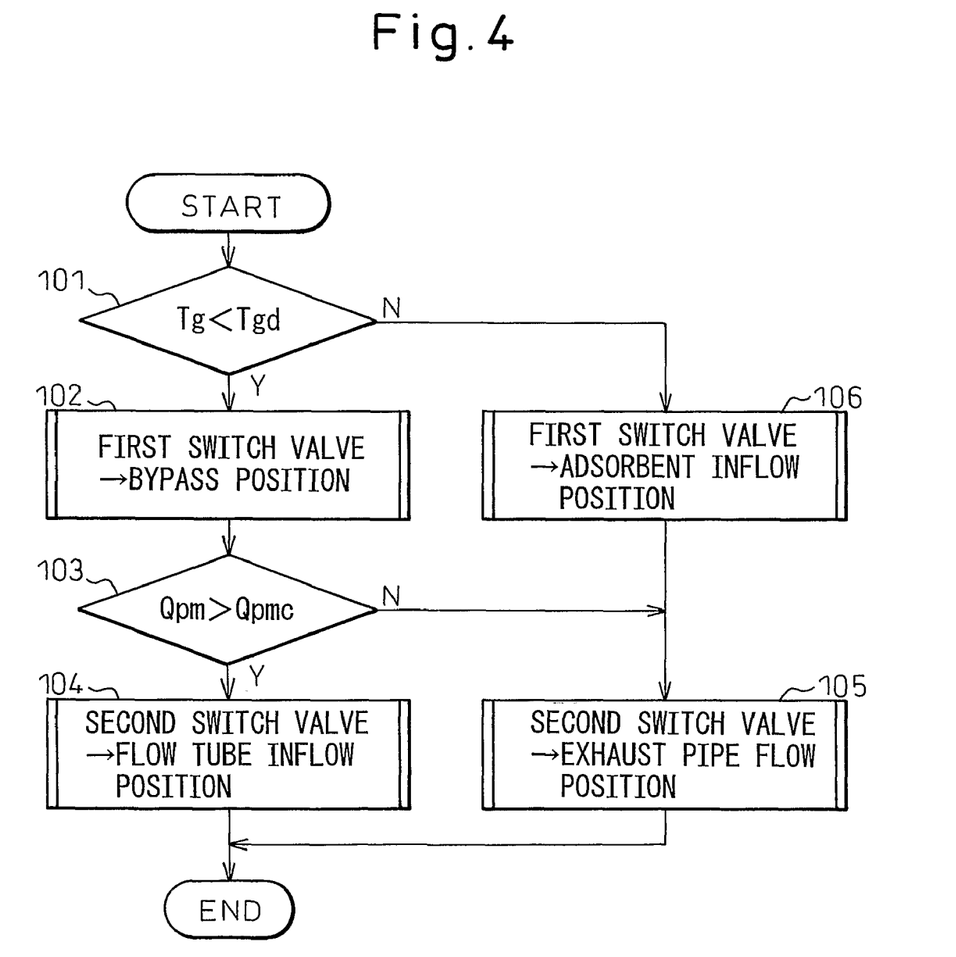
FIG. 4 is a flow chart of control of a switch valve of an ozone supply system.

FIG. 4 is a flow chart of the control of the switch valves 26a and 26b of the ozone supply system 20 of the present invention. First, at step 101, whether the immediately preceding exhaust temperature Tg detected by the exhaust temperature sensor 30 is lower than the decomposition start temperature Tgd or not is judged. The exhaust temperature sensor 30 is a sensor attached to the exhaust pipe 5 at the upstream side of the ozone supply system 20 and detects the temperature of the exhaust gas flowing through the exhaust pipe 5. When it is judged at step 101 that the immediately preceding exhaust temperature Tg is lower than the decomposition start temperature Tgd, the routine proceeds to step 102. At step 102, the switch position of the first switch valve 26a is made the bypass position, and ozone supplied from the ozone supply device 21 is supplied to the filter 6 without going through the ozone adsorbent 22.

Next, at step 103, whether the amount of deposition of PM Qpm on the filter 6 as estimated based on the output of the differential pressure sensor 31 is larger than the critical amount of deposition Qpmc or not is judged. Here, the differential pressure sensor 31 is a sensor for detecting the upstream/downstream pressure difference between the pressure of the exhaust gas at the upstream side of the filter 6 and the pressure of the exhaust gas at the downstream side of the filter 6. Further, the relationship between the upstream/downstream pressure difference of the filter 6 and the amount of deposition of PM on the filter 6 is found by experiments or calculations and is stored as a map in an electronic control unit (not shown) of the internal combustion engine. The amount of deposition of PM Qpm is estimated based on the upstream/downstream pressure difference of the filter 6 actually detected by the differential pressure sensor 31 and this map.

When the estimated amount of deposition of PM Qpm on the filter 6 is judged to be larger than the critical amount of deposition of PM Qpmc, the routine proceeds to step 104. At step 104, the switch position of the second switch valve 26b is set to the flow tube inflow position, the exhaust gas is made to flow to the ozone adsorbent 22, and the ozone adsorbed on the ozone adsorbent 22 is desorbed and supplied to the filter 6. On the other hand, when the estimated amount of deposition of PM Qpm on the filter 6 is judged to be the critical amount of deposition of PM Qpmc or less, the routine proceeds to step 105. At step 105, the switch position of the second switch valve 26b is set to the exhaust pipe flow position, whereby the exhaust gas flows through the exhaust pipe 5 to the filter 6 without flowing to the flow tube 24.

On the other hand, when at step 101 the immediately preceding exhaust temperature Tg is judged to be the decomposition start temperature Tgd or more, the routine proceeds to step 106. At step 106, the switch position of the first switch valve 26a is set to the absorbent inflow position and ozone supplied from the ozone supply device 21 is made to flow to and be adsorbed by the ozone adsorbent 22.

Note that in the above embodiment, a filter is used to trap the PM in the exhaust gas, but if the PM in the exhaust gas can be trapped, it is also possible to use another trapping device other than a filter, for example, an electrostatic trap.

Figure 5:
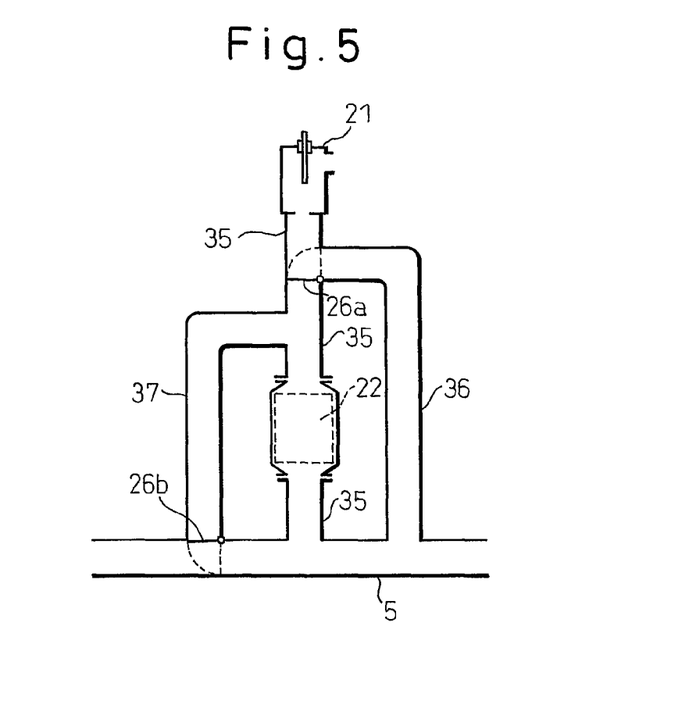
FIG. 5 is a view of another configuration of the ozone supply system.

Further, the ozone supply system 20 in the embodiment may also be comprised as shown in FIG. 5. That is, the ozone supply system of FIG. 5 has a main passage 35 for connecting the ozone supply device 21 and exhaust pipe 5 and provided with the ozone adsorbent 22 (corresponding to first passage 24a and second passage 24b of FIG. 1), a bypass passage 36 branching from the main passage 35 to bypass the ozone adsorbent 22 (corresponding to third passage 24c of FIG. 1), and a branch passage 37 branching from the exhaust pipe 5 and connected to the ozone adsorbent 22 (corresponding to fourth passage 24d of FIG. 1). Further, the part branching to the bypass passage is provided with the first switch valve 26a, while the part branching from the exhaust pipe 25 is provided with the second switch valve 26b.

The ozone supply system of the present invention does not have to be provided with all of the above components. For example, the branch passage 37 and second switch valve 26b need not be provided. In this case, to raise the temperature of the ozone adsorbent 22 higher than the critical adsorption temperature, a heater is provided around the ozone adsorbent 22, and a valve etc. is provided for introducing outside air to the ozone adsorbent 22. Further, the bypass passage 36 and first switch valve 26a need not be provided. In this case, all of the ozone supplied from the ozone supply device 21 flows through the ozone adsorbent 22. Therefore, when the temperature of the ozone adsorbent 22 is the critical adsorption temperature or less, ozone is adsorbed by the ozone adsorbent 22 until the critical adsorption of the ozone adsorbent 22. Ozone is supplied to the filter 6 after the critical adsorption is reached.

Example

Figure 6:
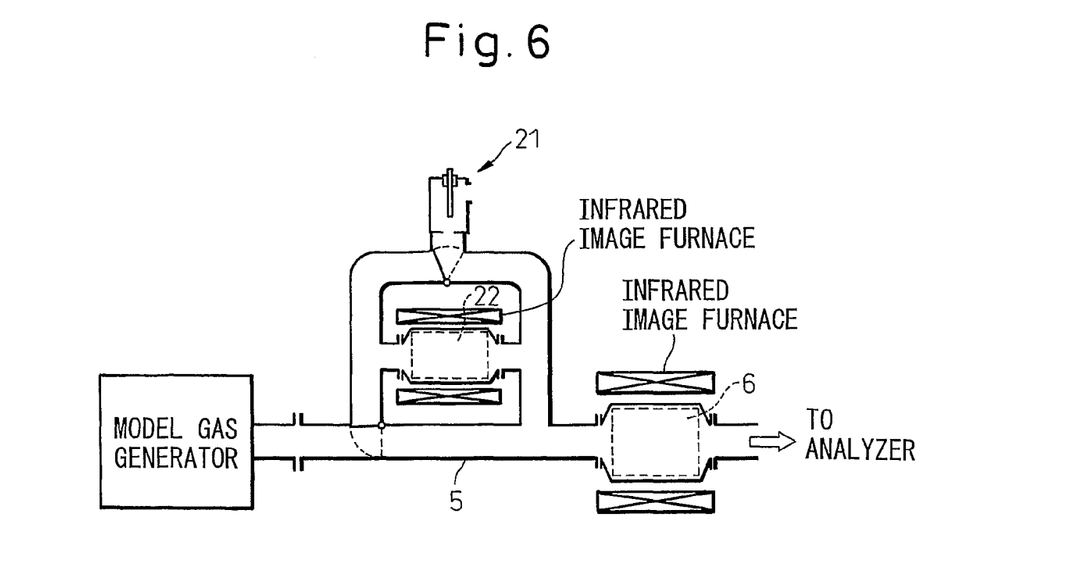
FIG. 6 is a schematic view of a test facility used in the working example.

The test facility shown in FIG. 6 was used for experiments to clarify the effects of the present invention. Here, the test facility shown in FIG. 6 was designed to use an infrared image furnace to adjust the filter 6 and ozone adsorbent 22 in temperature. The pipes between the different devices were heated and maintained at 150° C. using ribbon heaters. The exhaust pipe 5 was supplied from a model gas generator with a model gas comprised of 5 vol % of $O_2$, 500 vol ppm of NO, 150 vol ppm of $NO_2$, 80 vol ppm of $C_3H_6$, 3 vol % of $H_2O$, and the balance of $N_2$ at a flow rate of 10 liter/min and a temperature of 150° C.

As the filter 6, a 30 mm diameter×50 mm length cordierite diesel particulate filter (DPF) was used. This DPF 6 was formed by about 46.5 cells per square centimeter (300 cells per square inch), each cell having a side of a length of about 0.3 mm (12 mil). Further, as the ozone adsorbent 22, one comprised of a casing 25 packed with 50 g of ZSM-50 shaped into 3 mm diameter pellets was used. Further, the ozone supply device 21 supplied gas containing 500 vol ppm of $O_3$ and the balance of $O_2$ at a flow rate of 1 liter/min.

In the experiments, first a 2 liter diesel engine was operated at 2000 rpm×30 Nm for 1 hour. The PM in the exhaust gas was trapped by the DPF.

Next, as a comparative example, the infrared image furnace of the DPF 6 was set to 200° C., the model gas was supplied from the model gas generator and ozone was supplied from the ozone supply device 21 to the DPF 6 without going through the ozone adsorbent 22. The concentrations of CO and $CO_2$ in the gas flowing out from the DPF 6 were analyzed and the oxidation speed of the PM (average oxidation speed for 3 minutes after start of PM oxidation) was calculated from the analysis values.

On the other hand, as an invention example, first, ozone supplied from the ozone supply device 21 was run through the ozone adsorbent 22 for 30 minutes at room temperature to make the ozone adsorbent 22 adsorb the ozone. After this, the infrared image furnace for the DPF 6 was set to 200° C. and the infrared image furnace for the ozone adsorbent 22 was set to 150° C. Next, the model gas was run through the ozone adsorbent 22 to the DPF 6 and ozone was supplied from the ozone supply device 21 to the DPF 6 without going through the ozone adsorbent 22. The concentrations of CO and $CO_2$ in the gas flowing out from the DPF 6 were analyzed and the oxidation speed of the PM (average oxidation speed for 3 minutes after start of PM oxidation) was calculated from the analysis values.

As a result, the oxidation speed of the comparative example was 4.3 g/hl, while the oxidation speed of the invention example was 4.8 g/hl. From the above results, when the PM deposited on the filter 6 should be removed, it is learned that by supplying ozone from the ozone supply device 21 to the filter 6 and also desorbing ozone adsorbed on the ozone adsorbent 22 and supplying it to the filter 6, the PM deposited on the filter 6 can be quickly burned off.

While the invention has been described by reference to specific embodiments chosen for purposes of illustration, it should be apparent that numerous modifications could be made thereto by those skilled in the art without departing from the basic concept and scope of the invention.

The invention claimed is:

1. An exhaust gas purification system, comprising:
   a trapping device arranged on an engine exhaust passage that traps particulate matter in the exhaust gas;
   an ozone generator that generates ozone;
   an ozone adsorbent structured to adsorb ozone;
   a main passage leading from ozone generator through the ozone adsorbent to the trapping device; and
   an exhaust flow controller that controls a flow of the exhaust gas;
   wherein:
      at least part of the ozone generated by the ozone generator is adsorbed by the ozone adsorbent; and
      when an amount of the particulate matter trapped on the trapping device exceeds a predetermined amount, the exhaust gas flow controller controls the exhaust gas to flow into the ozone adsorbent thereby causing the ozone adsorbed on the ozone adsorbent to be desorbed from the ozone adsorbent and supplied to the trapping device.

2. The exhaust gas purification system as set forth in claim 1, wherein the ozone adsorbent is formed by zeolite.

3. The exhaust gas purification system as set forth in claim 1, further comprising:
a branch passage branching from the engine exhaust passage and connected to the ozone adsorbent;
wherein:
the exhaust flow controller adjusts the flow rate of exhaust gas flowing into the branch passage; and
when the amount of the particulate matter trapped in the trapping device exceeds the predetermined amount, the exhaust flow controller is controlled so that at least part of the exhaust gas to flow through the branch passage to the ozone adsorbent so that the ozone adsorbed in the adsorbent is desorbed from the adsorbent.

4. The exhaust gas purification system as set forth in claim 1, wherein the exhaust flow controller comprises an exhaust flow rate adjustment valve.

5. The exhaust gas purification system as set forth in claim 1, further comprising a particulate matter estimator that estimates the amount of the particulate matter trapped on the trapping device.

6. The exhaust gas purification system as set forth in claim 1, wherein the amount of the particulate matter trapped in the trapping device is estimated based on a pressure difference between a pressure of the exhaust gas at an upstream side of the trapping device and a pressure of the exhaust gas at a downstream side of the trapping device.

7. The exhaust gas purification system as set forth in claim 6, wherein the predetermined amount is an amount of the particulate trapped in the filter that causes the pressure difference to exceed a predetermined pressure difference.

8. The exhaust gas purification system as set forth in claim 1, further comprising:
a bypass passage branching off from the main passage and bypassing the ozone adsorbent; and
an ozone flow controller provided where the bypass passage branches off from the main passage, the ozone flow controller controlling a flow of the ozone generated by the ozone generator flowing into the bypass passage.

9. The exhaust gas purification system as set forth in claim 8, wherein, when the amount of the particulate matter trapped in the trapping device exceeds the predetermined amount, the ozone flow controller causes at least a part of the ozone generated by the ozone generator to flow through the bypass passage.

10. The exhaust gas purification system as set forth in claim 8, wherein the ozone controller comprises an ozone flow rate adjustment valve.

11. The exhaust gas purification system as set forth in claim 1, further comprising:
a temperature evaluation device that evaluates a temperature of the exhaust gas;
wherein even when the amount of the particulate matter trapped in the trapping device exceeds the predetermined amount, if the evaluated temperature of the exhaust gas is higher than a predetermined decomposition start temperature, the ozone flow controller is controlled so that at least a part of the ozone generated by the ozone generator flows through the main passage.

12. The exhaust gas purification system as set forth in claim 11, wherein the temperature evaluation device is located on the engine exhaust passage just before the exhaust flow controller.

* * * * *